United States Patent [19]

Shimizu

[11] Patent Number: 4,926,420
[45] Date of Patent: May 15, 1990

[54] TRANSMISSION SYSTEM OF A PACKET SIGNAL IN AN INTEGRATED NETWORK SYSTEM USING A FRAME FORMAT FLEXIBLE FOR VARIOUS FORMS OF THE INTEGRATED NETWORK SYSTEM

[75] Inventor: Hiroshi Shimizu, Tokyo, Japan
[73] Assignee: NEC Corporation, Tokyo, Japan
[21] Appl. No.: 319,391
[22] Filed: Mar. 6, 1989

[30] Foreign Application Priority Data

Mar. 4, 1988 [JP] Japan .................................. 63-52157

[51] Int. Cl.⁵ ................................................ H04J 3/24
[52] U.S. Cl. ..................................... 370/94.1; 370/82; 370/110.1
[58] Field of Search .................. 370/60, 94, 85, 110.1, 370/89, 95, 99, 119, 79, 82; 340/825.52

[56] References Cited

U.S. PATENT DOCUMENTS

| | | | |
|---|---|---|---|
| 4,700,340 | 10/1987 | Beranek et al. ........................ | 370/60 |
| 4,723,237 | 2/1988 | Andrew et al. ...................... | 370/119 |
| 4,727,542 | 2/1988 | Rokugo et al. .................... | 370/110.1 |
| 4,750,109 | 6/1988 | Kita ....................................... | 370/94 |
| 4,760,395 | 7/1988 | Katzeff et al. ........................ | 370/60 |
| 4,823,338 | 4/1989 | Chan et al. ............................ | 370/85 |

FOREIGN PATENT DOCUMENTS

86/03355  6/1986  World Int. Prop. O. ............ 370/60

Primary Examiner—Douglas W. Olms
Assistant Examiner—Alpus H. Hsu
Attorney, Agent, or Firm—Sughrue, Mion, Zinn, Macpeak & Seas

[57] ABSTRACT

For integration of ISDN system and LAN system, a flexible frame format is provided which comprises a frame identifier (FID) field, an address (ADDRESS) field, an data (DATA) field, and a frame check sequence (FCS) field. In a transmitting portion in the integrated system, a desired one of an ISDN data unit and an LAN data unit, an address information of a destination address DA and a source address SA, the FID indicating a type of the data unit, and the FCS are inserted in the data field, the address field, the FID field and the FCS field, respectively, to form a packet signal which is transmitted therefrom. In the receiving portion for the packet signal in the integrated system, the type of the data unit is discriminated from the FID and the address information in the packet signal, and the packet signal is processed at a corresponding one of ISDN data and LAN data processor. The use of the frame format enables to form the integrated network system in various forms. The frame format allows modification by addition of any control field. Therefore, the frame format is also used in an integrated LAN system of different type LAN systems.

12 Claims, 10 Drawing Sheets

TYP=ISDN, ADLN=00

TYP=ISDN, ADLN=1X(X=0,1)

TYP=LLC, ADLN=1X(X=0,1)

TYP=ISDN, ADLN=00

TYP=ISDN, ADLN=01

TYPE=ISDN, ADLN=1X(X=0,1)

TYPE=LLC, ADLN=1X(X=0,1)

BRIDGE 39

TRANSMISSION SYSTEM OF A PACKET SIGNAL IN AN INTEGRATED NETWORK SYSTEM USING A FRAME FORMAT FLEXIBLE FOR VARIOUS FORMS OF THE INTEGRATED NETWORK SYSTEM

BACKGROUND OF THE INVENTION

1. Field of the Invention

The present invention relates to integrated network systems of different types of network systems, and, in particular, to a packet signal frame format for supporting frame formats used in the different-type network systems integrated.

2. Description of the Prior Art

As digital data communication systems, there are some different-type network systems wherein the packet signals are formed according to different frame formats from one another. For example, an LAN (Local Area Network) system accommodates a plurality of terminal equipments or devices which are assigned with different addresses. When a terminal equipment intends as a source to transmit a data unit to another equipment as a destination through the LAN network, it is required for its source terminal equipment to form a packet signal including the own address as a source address, an address assigned to the other terminal equipment as a destination address, and the data unit according to a packet signal frame format prescribed in the LAN system.

In an integrated services digital network (ISDN) system recommended in the CCITT (International Telegraph and Telephone Consultative Communication) recommendations I series, those destination and source addresses are not used for media access control between terminal equipments through the network.

For integration of a plurality of different-type network systems, a multiple frame format approach and a single frame format approach are proposed in a paper entitled "ON the IEEE 802.9 Data Link Formats for the Case of Logically Out-of-band D-channel", IEEE 802.9 contribution, 1988 (Reference 1).

According to the multiple frame format approach, a frame or format identifier is added to frames used in individual network systems so as to distinguish the individual frames. This approach is advantageous for a certain integrating form of different-type network system. However, it is not utilized for some other integrating forms of the different-type network systems, because the approach is independent of respective network systems.

According to the single frame format approach, a specific frame format among different network systems is commonly used for transmission of other frames. This approach is advantageous for the specific network system but disadvantageous for the other network systems. For example, in integration of the LAN system and the ISDN system, the LAN frame is used by addition of the destination address and the source address to the ISDN frame. In this approach, it is necessary for terminal equipments to access the ISDN network through the LAN network.

Accordingly, both of the approaches proposed in Reference 1 have a limit for application on various forms for integrating different-type network systems.

SUMMARY OF THE INVENTION:

Therefore, it is an object of the present invention to provide a frame format which is flexible for various forms integrating different-type network systems.

It is another object of the present invention to provide a packet signal transmission system using the flexible frame format which is readily adapted for various forms of an integrated network system.

It is still another object of the present invention to provide a terminal equipment using the flexible frame format which is simple in construction and in access for all of network systems in an integrated network system.

The present invention is applicable to a data transmission system for transmitting a packet signal determined by a single frame format and having a transmission data unit for use in transmission of, as the transmission data unit, one of a plurality of different-type data units from a transmission source to a transmission destination in an integrated network system of a plurality of different-type network systems, the different-type data units being associated with the different-type network systems, respectively. According to the present invention, the single frame format comprises: a data field for carrying the transmission data unit; an address field comprising a source address portion and a destination address portion for carrying addresses assigned to the transmission source and the transmission destination in the integrated network system, respectively; and a frame identifier field comprising a type identifier portion for carrying a type identifier for indicating the type of the transmission data unit.

The frame identifier field may further comprise an address length identifier portion for carrying an address length identifier for indicating a bit length of each of the addresses of the transmission source or the transmission destination.

The single frame format may further comprise a control field for carrying a control data unit. The frame identifier field, the control field, the address field, and the data field are time-sequentially arranged in this order. The frame identifier field further comprises a control length identifier portion for carrying a control length identifier for indicating a bit length of the control data unit.

According to an aspect of the present invention, an integrated network system comprises a first type network, a second type network, and a plurality of terminal devices each for accessing one of the first type or second type networks by delivering a packet signal. The first type network has an address assigned thereto as a first address. The terminal devices have addresses assigned thereto as terminal addresses. Each of the terminal devices comprises: a first and a second data sources for generating a first type and a second type data unit to be transmitted to the first type and the second type networks, respectively; data selecting means responsive to a data selecting signal for selecting one of the first and second data units as a transmission data unit; address attaching means coupled to the data selecting means for attaching an address information set to the transmission data unit to produce an address attached data signal, the address information set comprising a pair of source and destination addresses, the source address being one of the terminal addresses assigned to the terminal device itself, the destination address being the first address when the transmission data unit is the first type data unit and being another of the terminal addresses which is accommodated in the second type network when the transmission data unit is the second type data unit; frame identifier attaching means coupled to the address attaching means for attaching a frame identifier to the address attached data signal to produce the packet signal, the frame identifier comprising a type identifier for indicating the type of the transmission data unit; and transmission control means for delivering the data selecting signal, the address information set, and the frame identifier to the data selecting means, the address attaching means, and the frame identifier attaching means, respectively.

Each of the terminal devices may further comprise: first data processing means for processing a first type reception data unit; second data processing means for processing a second type reception data unit; destination detecting means for detecting the reception destination address in the reception packet signal to deliver the reception packet signal when the reception destination signal coincides with the own terminal address assigned to the terminal device itself; frame identifier discriminating means coupled to the destination detecting means for discriminating the reception frame identifier in the reception packet signal to produce a discriminated signal and to deliver the reception packet signal; source detecting means coupled with the frame identifier discriminating means for detecting the reception source address in the reception packet signal to produce a detected signal and to deliver the reception packet signal; reception control means coupled to the frame identifier discriminating means and the source detecting means for producing a selection control signal based on the discriminated signal and the detected signal, the selection control signal being a first selection signal when at least one of the discriminated signal and the detected signal indicates a first type, and the selection control signal being a second selection signal when none of the discriminated signal and the detected signal is the first type; and processor selecting means responsive to the selection control signal for selecting one of the first or the second data processing means as a selected data processing means to deliver the reception data unit in the reception packet signal to the selected data processing means, whereby the first data processing means receives the reception data unit as the first type reception data unit when the selection control signal is the first type selection signal, the second data processing means receiving the reception data unit as the second type reception data unit when the selection control signal is the second type selection signal.

Further objects, features, and other aspects will be understood from the following description of preferred embodiments with reference to the accompanying drawings.

DESCRIPTION OF PREFERRED EMBODIMENTS:

Prior to description of embodiments of the present invention, the prior art will briefly be described with reference to FIGS. 1-7 so as to help better understanding of the present invention.

Figure 1:
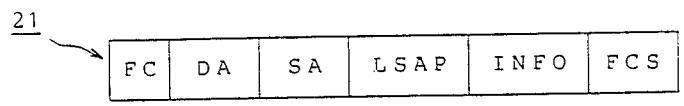
FIG. 1 is a view illustrating packet signal frame formats in known three types of LAN system.
Figure 1:
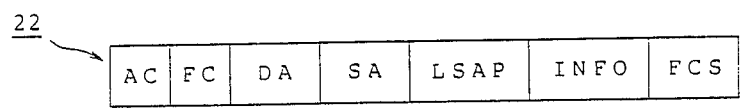

Referring to FIG. 1, frame formats 20, 21, and 22 shown therein are used for packet signals in known LAN systems. The frame format 20 is called a CSMA/CD (Carrier Sense Multiple Access with Collision Detection) format and comprises an address field and an LLC (Logic Link Control) data unit field and FCS (Frame Check Sequence) field as shown in the figure. The address field comprises a DA (Destination Address) portion and an SA (Source Address) portion, while the LLC data unit field comprises an LSAP (Link Service Access Point) portion and an INFO (Information) portion. The LSAP portion comprises a DSAP (Destination Service Access Point) and an SSAP (Source Service Access Point) as is known in the art. With respect to the CSMA/CD, reference is made to ANSI/IEEE std 802.3-1985 (Reference 2) in addition to Reference 1.

Another frame format 21 is dependent on a, so called, Token Passing Bus Access Method and is similar to the CSMA/CD frame format except an FC (Frame Control) field as will be noted from the figure. With respect to the Token Passing Bus Access Method, reference is made to the ANSI/IEEE std 802.4-1985 (Reference 3) and Reference 1.

As will be readily understood from the figure, the other frame format is characterized by addition of an AC (Access Control) field to the frame format by the Token Passing Bus Access Method. The AC and FC fields will collectively referred to as a control field, hereinafter. With respect to the Token Ring Access Method, reference is made to the ANSI/IEEE std 802.5-1985 (Reference 4) and Reference 1.

Although these frame formats have delimiters such as a starting delimiter (SD) and an ending delimiters (ED) and other fields, they are omitted in the figure for the purpose of simplification.

As will be noted from the figure, two frame formats 21 and 22 have a common frame portion which is similar to the other frame format 20 which comprises the address field (DA+SA), the LLC data unit (LSAP+INFO) and the FCS field. Therefore, the frame portion will often be referred to as an LAN frame, hereinafter.

Figure 2:
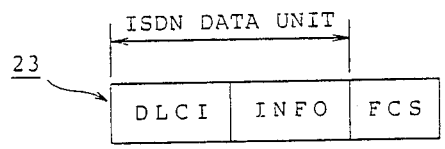
FIG. 2 is a view illustrating a packet signal frame format in a known ISDN system.

Referring to FIG. 2, the shown frame format 23 is an ISDN frame format which comprises an ISDN data unit field and an FCS field. The ISDN data unit field comprises a DLCI (Data Link Connection Identifier) portion and an INFO portion. The DLCI portion comprises an SAPI (Service Access point Identifier) and a TEI (Terminal Endpoint Identifier) as is known in the art. Actually, a starting flag and an ending flag are added to the shown frame format but are ommited in the figure.

With respect to the ISDN frame format, reference is made to the CCITT recommendations described in the preamble.

Figure 5:
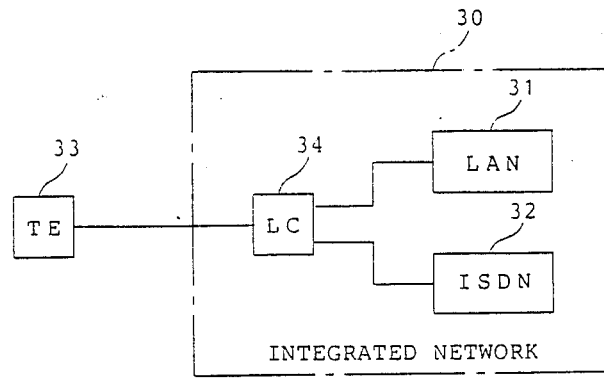
FIG. 5 is a block diagram view illustrating a known ISDN-LAN integrated network system.
Figure 6:
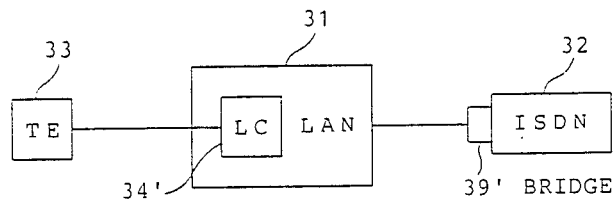
FIG. 6 is a block diagram view illustrating another ISDN-LAN integrated network system.

In integration of the LAN system and the ISDN system as shown in FIGS. 5 and 6 which will later be described, multiple frame format approach and single frame format approach are known in the prior art (Reference 1) so as to enable to transmit any type of the LAN frame information and the ISDN frame information.

Figure 3:
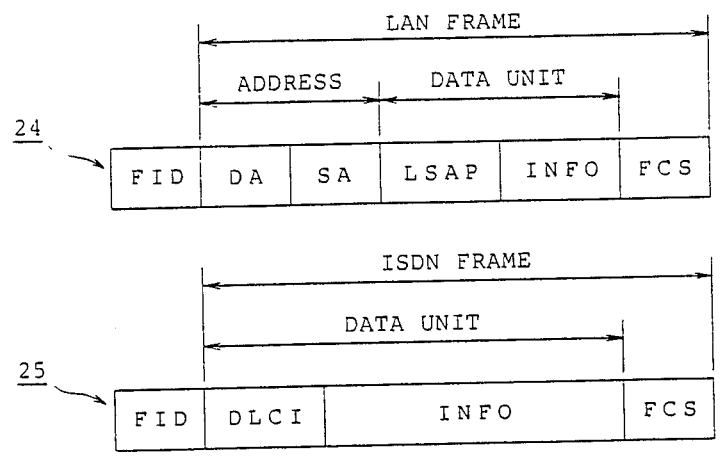
FIG. 3 is a view illustrating known packet signal frame formats used in an LAN-ISDN integrated network system.

Referring to FIG. 3, signal frames 24 and 25 are ones according to the multiple frame format approach, and are for transmission of the LAN frame information and for transmission of the ISDN frame information, respectively. That is, one octet field of frame or format identifier FID is attached to the LAN and the ISDN frames. For example, the frame identifier FID indicates that the frame is for transmission of the ISDN frame information when FID is "0", and indicates for transmission of the LAN frame information when FID=1.

Figure 4:
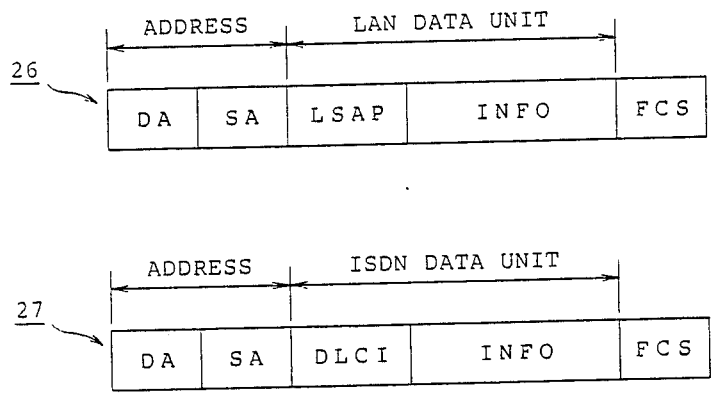
FIG. 4 is a view illustrating another known signal frame formats used in an LAN-ISDN integrated network system.

Referring to FIG. 4, the signal frames 26 and 27 are dependent on the single frame format approach and are shown as ones for carrying the LAN frame information and the ISDN frame information, respectively. It will be understood that the signal frame 26 is the LAN frame itself and that the signal frame 27 is also similar to the LAN frame format which comprises the address field, the data unit field, and the FCS field. That is, the LAN frame format is used for carrying both of the LAN frame information and the ISDN information.

In the ISDN-LAN integrated network system, an address is assigned to the ISDN and is carried in either one of the DA and SA fields in the signal frame 27.

Referring to FIG. 5, the known ISDN-LAN integrated network system shown therein comprises an integrated network 30 of a LAN 31 and ISDN 32, and a plurality of terminal equipments or devices (one of which is shown at 33). The terminal equipment (TE) 33 is connected to a line circuit (LC) 34 in the integrated network 30. The line circuit 34 is a switch for operatively connecting the terminal equipment 33 and a selected one of the LAN 31 and the ISDN 32.

Now, operation will be described in connection with a case where the multiple frame format approach (FIG. 3) is used in the system.

When the terminal equipment 33 accesses the LAN 31 in the system, the terminal equipment 33 generates and transmits a packet signal of the signal frame 24 with FID=1. The line circuit 34 receives the packet signal and discriminates FID=1 and then supplies the signal to the LAN 31 after removing the FID. In the similar manner, a packet signal of the signal frame 25 with FID=0 is received at the line circuit 34 and is supplied to the ISDN 32 after the FID is removed. On the other hand, when the LAN 31 or the ISDN 32 accesses the terminal equipment 33, the line circuit 34 attaches the FID (=1) to the LAN frame signal from the LAN 31 or the FID (=0) to the ISDN frame signal from the ISDN 32. Then, the line circuit 34 transmits the signal frame 24 or 25 to the terminal equipment 33.

In use of the single frame format approach (FIG. 4), the line circuit 34 receives a packet signal from the terminal equipment 33 and must detect whether or not the destination address DA carries the address assigned to the ISDN 32 in the integrated network 30. The detection of DA complicates the line circuit 34 in comparison with detection of only the frame identifier FID because DA has a bit length longer than FID. Therefore, the single frame format approach is disadvantageous for the ISDN-LAN integrated network system of a type shown in FIG. 5 in comparison with the multiple frame format approach.

Referring to FIG. 6, another ISDN-LAN integrated network system which comprises the LAN 31 and ISDN 32 connected to each other. A plurality of terminal equipments (one of which are shown at 33) are accommodated in the LAN 31. In the system, the ISDN 32 and the terminal equipment 33 are connected through the LAN 31.

In the system, the ISDN 32 is considered equivalent to a medium such as the terminal equipment connected to the LAN 31. A bridge 39' performs addition and removal of the destination and the source addresses DA and SA for the ISDN frame information. Therefore, it will be understood that use of the LAN frame format is advantageous for interconnection of the terminal equipment 33 and the ISDN 32 as well as interconnection between the terminal equipment 33 and the LAN 31. Therefore, the single frame format approach illustrated in FIG. 4 is advantageous in the ISDN-LAN integrated system of a type shown in FIG. 6.

However, the multiple frame format approach illustrated in FIG. 3 is disadvantageous for interconnection between the terminal equipment 33 and the ISDN 32 because the signal frame 25 does not have destination and source addresses DA and SA as shown in FIG. 3.

Figure 7:
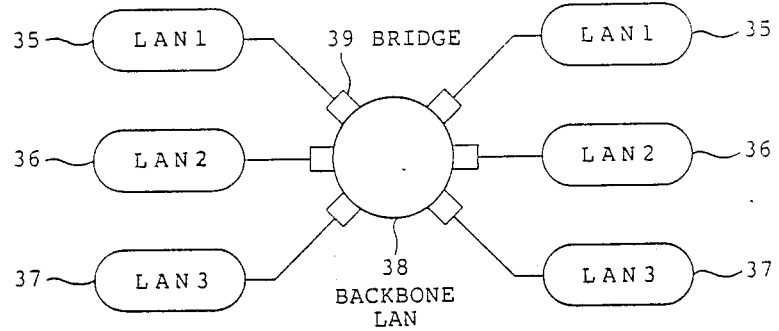
FIG. 7 is a block diagram view illustrating a known integrated LAN system.

Referring to FIG. 7, a plurality of LANs 35, 36, and 37 of different three types $LAN_1$, $LAN_2$, and $LAN_3$ are connected to a backbone LAN 38 through bridge circuits 39, respectively. The three types of $LAN_1$, $LAN_2$, and $LAN_3$ use the CSMA/CD, the Token Passing Bus Access Method, and Token Ring Access Method, respectively. However, frame formats according to those three access methods are different, particularly, in the bit length from the frame start to the address field, from each other as shown in FIG. 1. Therefore, since timing for detecting the address field is different in dependence on the types of signal frames 20, 21, and 22, it is quite difficult to process those different types of signals in the integrated LAN system as shown in FIG. 7.

The present invention provides a signal frame format which is conveniently used in and flexible for various systems integrating different-type network systems.

Figure 8:
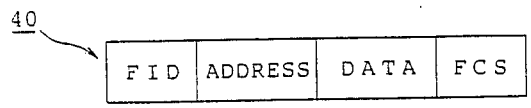
FIG. 8 is a view illustrating a packet signal frame format according to an embodiment of the present invention.

Referring to FIG. 8, a frame format 40 shown therein is for use in an integrated network system of the different-type network systems and is an embodiment of the present invention. The frame format 40 comprises a frame identifier (FID) field, an address field, a data field, and a frame check sequence (FCS) field. The FID field is for carrying a type identifier for indicating a type of a data unit or a type of the network system relating to the type of the data unit. The address field is for carrying a destination and a source address DA and SA. The data field is for carrying the data unit. The FCS field is for carrying the frame check sequence.

In use of the frame format 40 in the ISDN-LAN integrated network system shown in FIG. 5 or FIG. 6, the FID is for indicating which the data unit is the ISDN data unit or the LAN data unit. On transmission of the LAN frame information, the LAN frame information is inserted in the address field, the data field, and the FCS field to form a packet signal frame 41 shown in FIG. 9. The FID indicates a type for the LAN. In other words, the FID is attached to the LAN frame.

Figure 9:
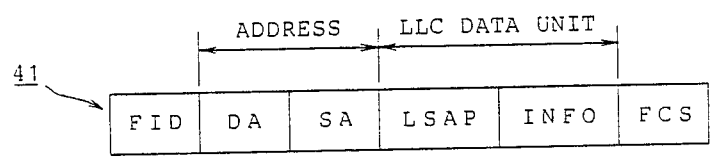
FIG. 9 is a view illustrating packet signal frames according to the frame format of FIG. 8.
Figure 9:
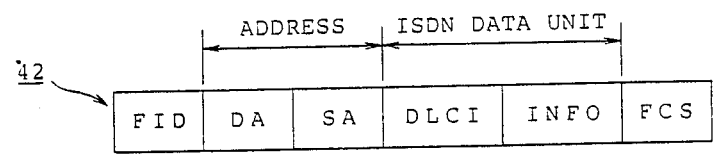

For the transmission of the ISDN frame information, it is inserted in the data field and the FCS field to form the packet signal 42 as shown in FIG. 9. The FID indicates a type for the ISDN. The address assigned to the ISDN 32 in the ISDN-LAN integrated network system is inserted in the destination address DA portion or the source address SA portion in the address field.

Figure 10:
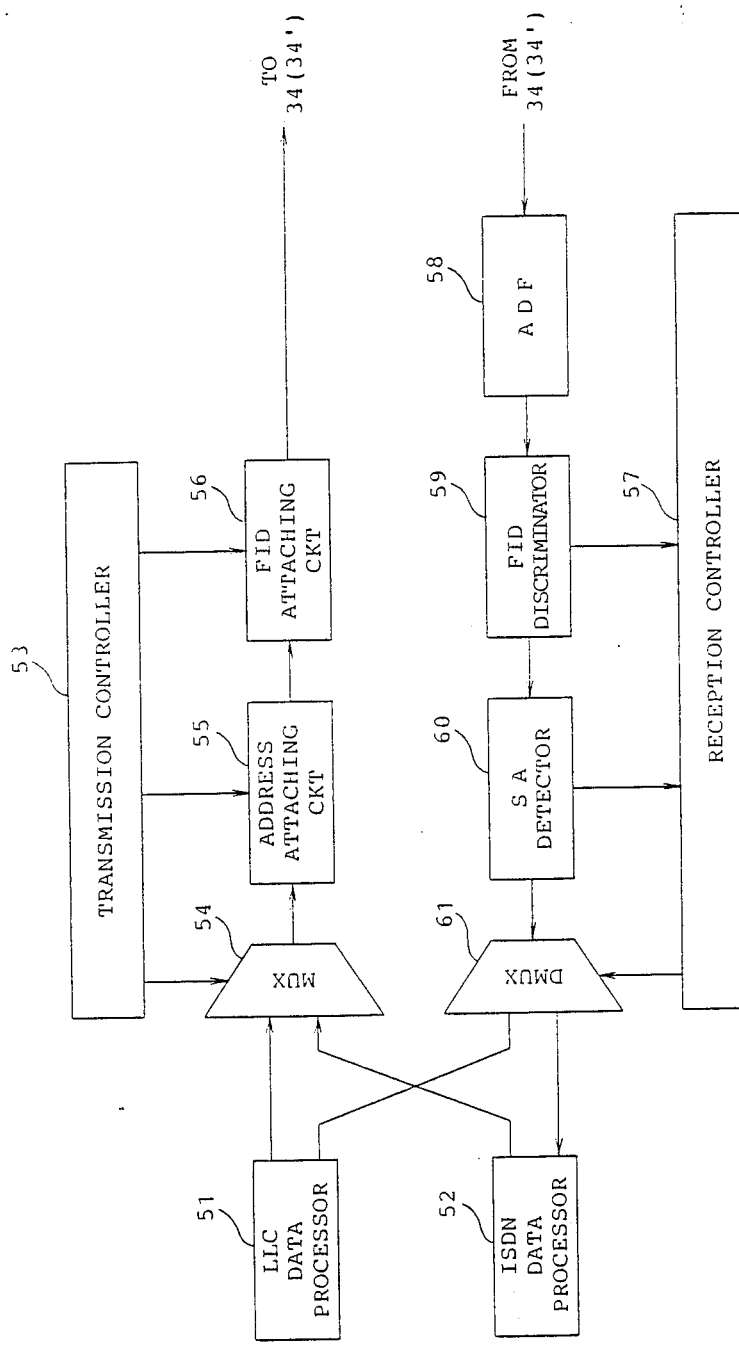
FIG. 10 is a block diagram view illustrating a terminal equipment in the integrated network system of FIG. 5 but using the frame format of FIG. 8.

Referring to FIG. 10, description will be made as to an arrangement of the terminal equipment 33 in the integrated network system of FIG. 5 or FIG. 6 using the frame format of FIG. 8.

The terminal equipment 33 comprises an LLC data processor 51, an ISDN data processor 52, a transmission controller 53, a multiplexer (MUX) 54, an address attaching circuit 55, an FID attaching circuit 56, a reception controller 57, an address filter (ADF) 58, an FID discriminator 50, an SA detector, and a demultiplexer (DMUX) 61.

The LLC data processor 51 is for generating an LLC data unit to be transmitted and for processing an LLC data unit received. The ISDN data processor 52 is for generating an ISDN data unit to be transmitted and for processing an ISDN data unit received. The multiplexer 54 is a selector for selecting one of the LLC and ISDN data unit from the processors 51 and 52 as a transmission data unit under control of the transmission controller 53 to deliver the transmission data unit from the selected processor 51 or 52 to the address attaching circuit 55. The address attaching circuit 55 is for attaching the address pair of DA and SA to the transmission data unit delivered from the multiplexer 54 under control of the transmission controller 53 to deliver an address attached signal to the FID attaching circuit 56. The FID attaching circuit 56 is for attaching the FID to the address attached signal delivered from the address attaching circuit 55 to form a packet signal 41 or 42 which is transmitted to the integrated network.

Therefore, when a request originates at the terminal equipment 33 for transmitting the ISDN data unit, the transmission controller 53 controls the multiplexer 54 to select the ISDN data unit from the processor 52 and controls the address attaching circuit 55 and the FID attaching circuit 56 to form the packet frame signal 42 in FIG. 9. In the address attaching circuit 55, the address of the ISDN 32 and the address of its own terminal equipment 33 are attached to the transmission data unit as the destination address DA and the source address SA, respectively. In the FID attaching circuit 56, a type identifier for indicating a type for the ISDN data unit is attached to the address attached signal as the FID.

On originating a request for transmitting the LLC data unit, the LLC data processor 51 is selected by the multiplexer 54 to produce the LLC data unit as the transmission data unit. An address of a destination terminal equipment and the address of the own terminal equipment 33 are attached to the transmission data unit as DA and SA, respectively, in the address attaching circuit 55 to produce the address attached signal, and an identifier for indicating a type for the LLC data unit is attached to the address attached signal as the FID in the FID attaching circuit 56.

The address filter 58 is for detecting the destination address DA in a received packet signal from the ISDN-LAN integrated network 30 to deliver the packet signal when the detected DA is equal to the own address assigned to the terminal equipment 33. When the detected DA is different from the own address, the packet signal is ignored. The FID discriminator 59 is for discriminating the FID in the packet signal delivered from the address filter 58 to supply the discriminated result to the reception controller 57. The packet signal is applied to the SA detector 60 from the FID discriminator 59. The SA detector 60 is for detecting the source address SA in the address field in the packet signal to supply the detected result to the reception controller 57. The reception controller 57 is for deciding from the discriminated result and the detected result whether or not the packet signal is for transmission of the ISDN data unit to control the demultiplexer 61 by the decided result. That is, when ISDN data unit or the ISDN address is indicated by the discriminated result or the detected result, the reception controller 57 produces a selection control signal to control the demultiplexer 61 to select the ISDN data processor 52 and the packet signal is delivered to the ISDN data processor 52. When neither the discriminated result nor the detected result indicate the ISDN data unit and the ISDN address, the reception controller 57 produces another selection control signal to control the demultiplexer 61 to select the LLC data processor 51. Accordingly, the packet signal is processed in the LLC data processor 51.

DA, FID, and SA may be removed at the address filter 58, FID discriminator 59, and SA detector 60. Then, only the data unit is supplied to a selected one of the processors 51 and 52.

The line circuit 34 in FIG. 5 is formed in an arrangement similar to the arrangement as shown in FIG. 10. In that case, the LLC data processor 51 and the ISDN data processor 52 should be understood as the LAN 31 and the ISDN 32, and the address attaching circuit 55 should be understood unable for transmission of the LAN data unit because the destination address and the source address are delivered together with LAN data unit from the LAN 31.

In FIG. 6, the LAN 31 is provided with a line circuit (LC) 34' for performing attachment and removal of the FID in dependence on transmission and reception of the packet signal.

Figure 11:
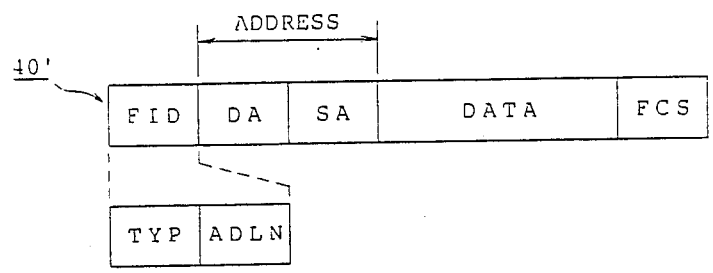
FIG. 11 is a view illustrating another frame format which is a modification of the frame format of FIG. 8.

Referring to FIG. 11, another frame format 40' shown therein is similar to the frame format 40 in FIG. 8 but is different in that the FID field is separated into two portions TYP and ADLN. The TYP portion is for carrying the type identifier for indicating the ISDN or the LAN and the ADLN portion is for carrying an address length identifier or information of bit length of the DA and SA address.

Figure 12:
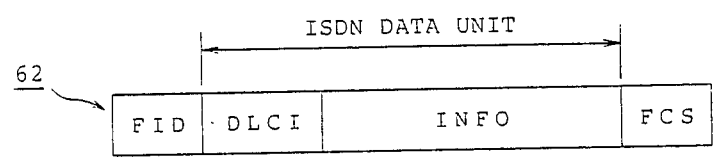
FIG. 12 is a view illustrating various frame signals formed according to the frame format of FIG. 11.
Figure 12:
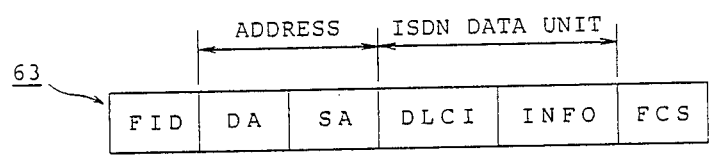
Figure 12:
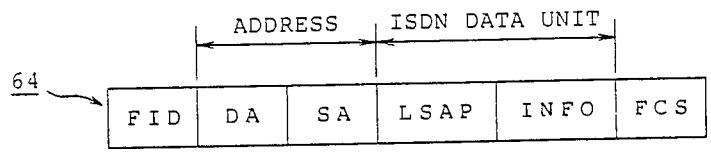

Referring to FIG. 12, three packet signal frames 62, 63, and 64 are formed according to the frame format shown in FIG. 11. The signal frame 62 is for transmission of the ISDN data unit, and the address field is removed. That is, the type identifier indicates the ISDN data unit (TYP=ISDN) and the address length information indicates zero length (ADLN=00). That is, the use of the frame format 40' permits to omit the address field for transmission of the ISDN data unit. The signal frame 62 is similar to the known signal frame 25 in FIG. 3 but is different therefrom in that the FID field has the address length information as ADLN.

The signal frames 63 and 64 are for TYP=ISDN and TYP=LLC with presence of the address field (ADLN=1x, x=0, or 1), respectively. The bit length of DA and SA can be indicated to be 48 or 16 by 1 or 0 for x. The signal frames 63 and 64 are similar to the signal frames 42 and 41 in FIG. 9, respectively, but are different from them in that the FID field has the address length information as ADLN.

Figure 13:
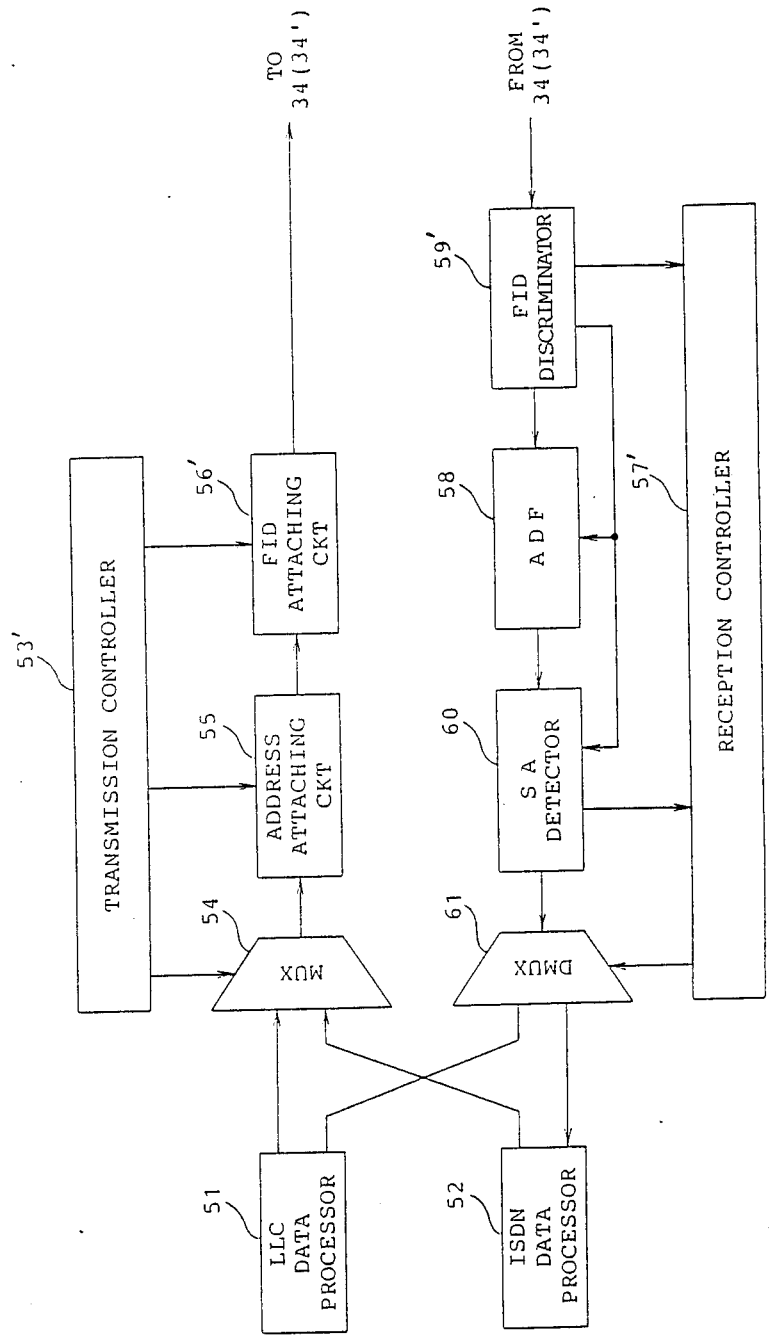
FIG. 13 is a block diagram view of a terminal equipment adaptable for use of the frame format of FIG. 11.

Referring to FIG. 13, the terminal equipment 33 is for use of the frame format 40' and is similar to the terminal equipment shown in FIG. 10 except the following differences. That is, the transmission controller, the FID attaching circuit, the FID discriminator, and the reception controller in FIG. 13 additionally have different function from those circuits in FIG. 10 and are therefore, represented by the same reference numerals but with prime ('). Further, the FID discriminator 59' and the address filter 58 are replaced each other in comparison with the arrangement of FIG. 10.

The transmission controller 53' controls the address attaching circuit 55 to be unable when forming the signal frame 62 in FIG. 12. The FID attaching circuit 56' performs attachment of the type identifier TYP and the address length information ADLN as the FID under control of the transmission controller 53'.

The address length information ADLN is determined for each terminal equipment at establishment of the integrated network system in the similar manner as the known LAN system.

The FID discriminator 59' discriminates the identifiers TYP and ADLN in the packet signal from the integrated network. When ADLN=00 is discriminated, the FID discriminator 59' delivers an unable signal to the address filter 58 and the SA detector 60 and supplies the discriminated result to the reception controller 57'. The reception controller 57' controls the demultiplexer 61 to select the ISDN data processor 52. Accordingly, the address filter 58 and the SA detector 60 do not operate and the packet signal is delivered to the ISDN data processor 52.

On receiving a packet signal of the signal frame 63 or 64 in FIG. 12, the ADLN is not zero but ADLN=1x. When the address bit length indicated by the ADLN is different from the address bit length assigned to the own terminal equipment 33, the FID discriminator 59' ignores the packet signal received thereat.

When the discriminated address bit length is equal to the address bit length assigned to the own terminal equipment 33, the FID discriminator 59' discriminates the TYP in the FID and supplies the discriminated result to the reception controller 57'. Then, the packet signal is applied to the address filter 58. The packet signal is processed at the address filter 58, the SA detector 60, and the demultiplexer 61 in the similar manner as in FIG. 10 and are delivered to the LLC data processor 51 or the ISDN data processor 52.

Figure 14:
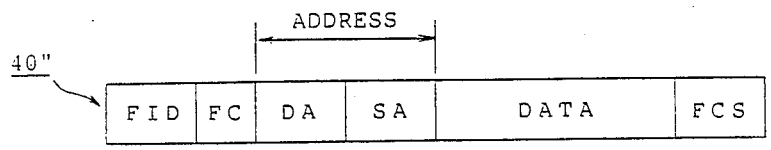
FIG. 14 is a view illustrating another frame format which is another modification of the frame format of FIG. 8 and various signal frames according to the modification frame format.
Figure 14:
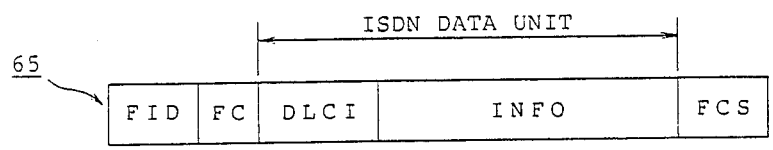
Figure 14:
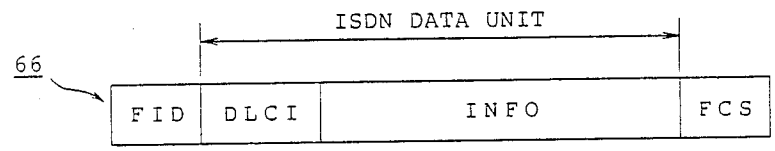
Figure 14:
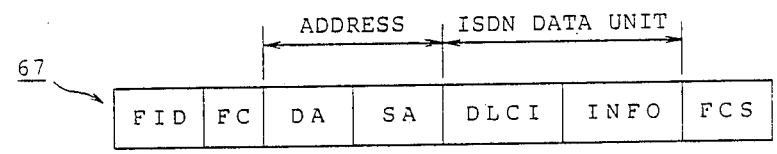
Figure 14:
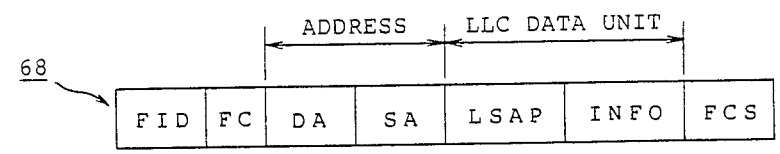

The frame format 40' in FIG. 11 is modified by attachment of the FC field as shown at 40" in FIG. 14. Signal frames 66, 67, and 68 are corresponding to the signal frames 62, 63, and 64, respectively, but have the FC field.

The frame format 40" enables to determine a signal frame 66 without the FC field for transmission of the ISDN data unit by setting ADLN=01.

The terminal equipment 33 in the system using the frame format 40" is realized in an arrangement similar to the terminal equipment as shown in FIG. 13 by provision of an FC attaching circuit controlled by the transmission controller 53'.

The frame format 40 in FIG. 8 is also modified by provision of the control field such as the FC field and/or the AC field shown in FIG. 1. In that case, an identifier should be provided for indicating information of the bit length from the start of the frame to the address field. The information will be referred to as a frame format information FMT, hereinafter.

Figure 15:
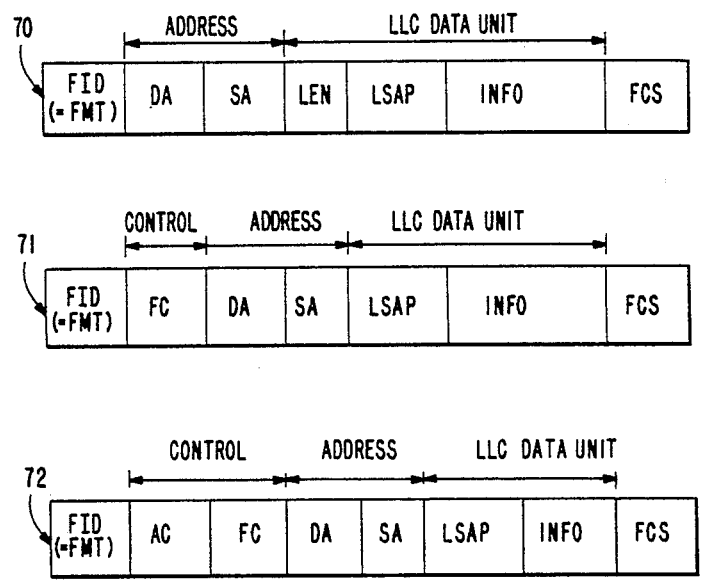
FIG. 15 is a view illustrating various signal frames according to another modification of the frame format of FIG. 8 which are adaptable for use in the integrated LAN system of FIG. 7.

FIG. 15 shows signal frames 70, 71, and 72 which are formed according to the modification so as to realize the integrated LAN system in FIG. 7.

The signal frame 70 is used for $LAN_1$ employing the CSMA/CD, another signal frame 71 is used for $LAN_2$ employing the token passing bus access method, and the other signal frame 72 is used for $LAN_3$ employing the token ring access method. Therefore, the signal frame 71 is provided with the FC field and the signal frame 72 is provided with the AC and FC fields shown in the figure.

According to presence of the FC field and both of the AC and FC fields and absence of those fields, FMT is determined and is inserted in the FID field in each of the signal frames 70, 71, and 72.

Each bridge 39 in FIG. 7 is formed so as to discriminate or form that one of those signal frames which is corresponding to the $LAN_1$, $LAN_2$, or $LAN_3$.

Figure 16:
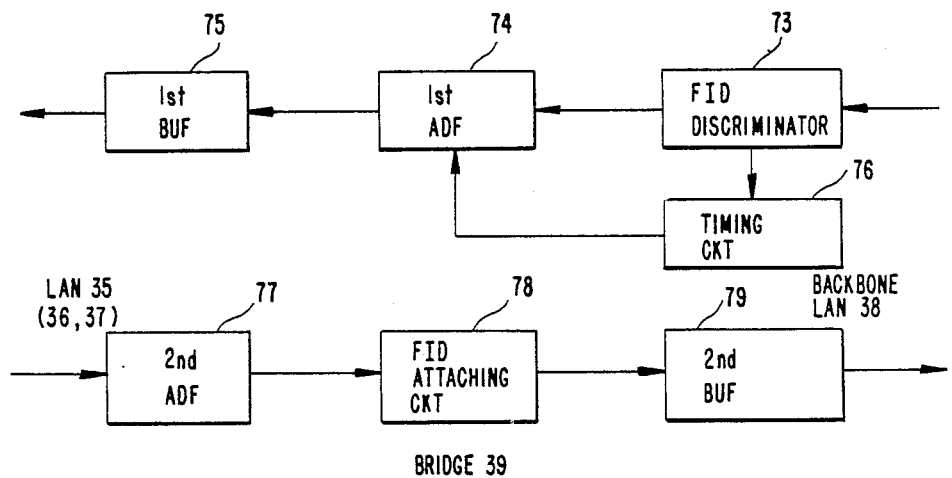
FIG. 16 is a block diagram view of a bridge used in the integrated LAN system of FIG. 7 for processing the signal frames of FIG. 15.

Referring to FIG. 16, the bridge 39 comprises an FID discriminator 73, a first address filter 74, a first buffer circuit (BUF) 75, and a timing circuit 76 so as to process a packet signal transmitted from the backbone LAN 38 to a corresponding LAN, for example, $LAN_1$ 35. The FID discriminator 73 discriminates FID in the packet signal delivered from the backbone LAN 38. When the FID indicates FMT=0, the FID discriminator 73 delivers the packet signal to the first address filter 74 and delivers FMT information to the timing circuit 76. When FMT is not zero, the FID discriminator 73 ignores the packet signal.

The timing circuit 76 generates a detection timing for determining the DA detection timing from the FMT information.

The first address filter 74 detects the destination address DA in the packet signal delivered from the FID discriminator 73 according to the timing signal. When the detected DA represents address for the $LAN_1$ 35 connected to the bridge 39, the first address filter 74 allows the packet signal to pass therethrough to the first buffer circuit 75. Nevertheless, the packet signal is stopped at the first address filter 35.

The first buffer circuit 75 removes the FID field in the packet signal delivered from the first address filter 74 to form the LLC frame signal 20 in FIG. 1 and sends out the LLC frame signal 21 to the LAN$_1$ 35.

The bridge 39 also comprises a second address filter 77, an FID attaching circuit 78, and a second buffer circuit 79 in order to process the frame signal 20 (FIG. 1) from the LAN$_1$ 35 to produce the frame signal 70.

The second address filter 77 receives the packet signal 20 from the corresponding LAN$_1$ 35 and detects the source address SA. When the SA is decided correct, the frame signal 20 is delivered to the FID attaching circuit 78. The FID attaching circuit 78 attaches FMT=0 to the frame signal 20 as the FID to form the frame signal 70 in FIG. 15. The frame signal 70 is delivered to the backbone LAN 38.

Bridges connected to the other LAN$_2$ 36 and LAN$_3$ 37 are formed in the similar arrangement shown in FIG. 16 so as to form the frame signals 71 and 72 (FIG. 15) from the frame signals 21 and 22 (FIG. 1), resepectively.

It will be noted that a value of the FMT detected in the bridge corresponding to each of LAN$_2$ and LAN$_3$ is different from the FMT value detected at the bridge corresponding to LAN$_1$. Therefore, the DA detection timing in each bridge is also different from each other. That is, the first address filter 74 is started immediately after reception of the FID for the LAN$_1$ as described above. But, the first address filter in the bridge for LAN$_2$ is started after elapse of time duration corresponding to the FC field length from the reception of the FID. Further, the first address filter in the bridge for LAN$_3$ is started after elapse of a time duration corresponding to the AC and the FC fields after reception of the FID.

Figure 17:
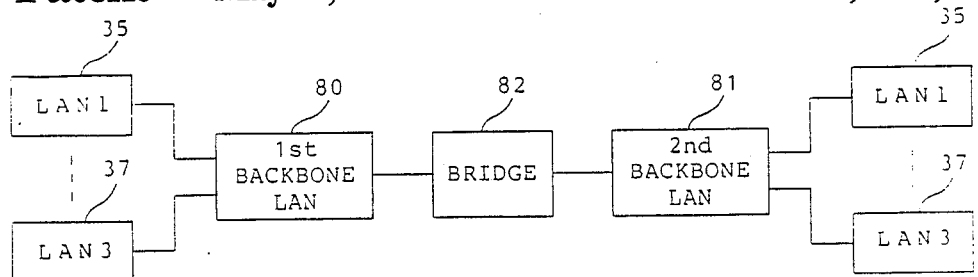
FIG. 17 is a block diagram view of another integrated LAN system which is realized by use of the signal frames of FIG. 15.

Referring to FIG. 17, another integrated LAN system shown therein comprises a first and a second backbone LAN 80 and 81 each accommodating different type LANs such as LAN$_1$ 35, LAN$_3$ 37 and LAN$_2$ 36 to form an integrated LAN system. The first and the second backbone LANs 80 and 81 are connected to each other through a bridge 82. The system is realized by use of the frame signals 70, 71, and 72 shown in FIG. 15.

Figure 18:
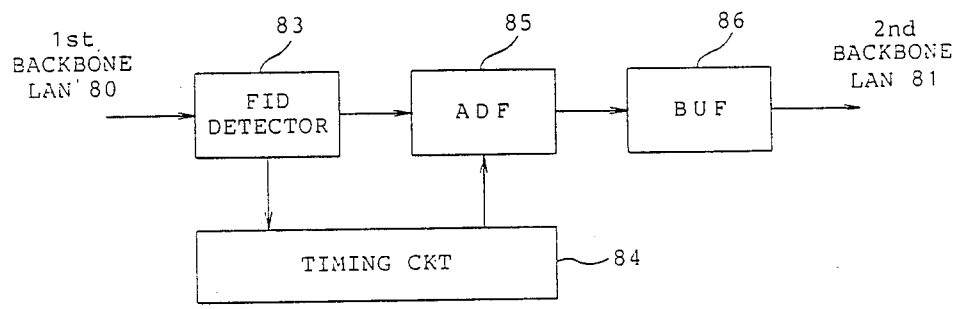
FIG. 18 is a block diagram view illustrating a bridge in FIG. 17.

Referring to FIG. 18, the bridge 82 comprises an FID detector 83, a timing circuit 84, an address filter 85 and a buffer circuit 86.

The FID detector 83 detects FMT in the FID field in the packet signal 70, 71, or 72 and supplies the detected FMT information to the timing circuit 84. The packet signal is also applied to the address filter 85.

The timing circuit 84 generates a timing signal for detecting the destination address DA in the packet signal on the base of the FMT information.

The address filter 85 operates in response to the timing signal to detect the DA in the packet signal. When the address detector 85 decides that the packet signal is for one of LANs accommodated in the second backbone LAN 81, the address filter 85 allows the packet signal to pass therethrough to the buffer circuit 86. The buffer circuit 86 sends out the packet signal to the second backbone LAN 81.

The bridge 82 is also provided with similar circuits 83–86 for delivering the packet signal from the second backbone LAN 81 to the first backbone LAN 80.

Figure 19:
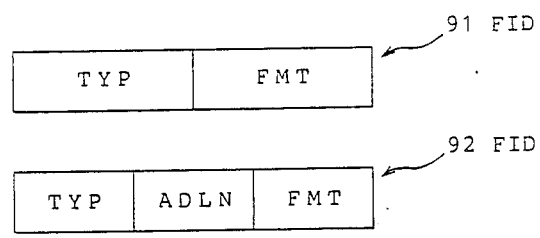
FIG. 19 is a view illustrating different modifications of the FID field which enable integration of an integrated LAN and an ISDN.

Referring to FIG. 19, the FID field in FIG. 8 is modified to comprise the TYP and the FMT information as shown at 91. As a result, it is possible to realize integration of the integrated LAN system and the ISDN system.

Further, the FID is also modified to comprise the TYP, and the ADLN and the FMT as shown at 92 in FIG. 19. It will be readily understood that this modification also enables to realize the integration of the integrated LAN system and the ISDN system.

What is claimed is:

1. In a data transmission system for transmitting a packet signal determined by a single frame format and having a transmission data unit for use in transmission of, as the transmission data unit, one of a plurality of different-type data units from a transmission source to a transmission destination in an integrated network system of a plurality of different-type network systems, said different-type data units being associated with said different-type network systems, respectively, the improvement wherein said single frame format comprises:
   a data field for carrying the transmission data unit;
   an address field comprising a source address portion and a destination address portion for carrying addresses assigned to the transmission source and the transmission destination in the integrated network system, respectively; and
   a frame identifier field comprising a type identifier portion for carrying a type identifier for indicating the type of said transmission data unit.

2. A data transmission system as claimed in claim 1, wherein said frame identifier field further comprises an address length identifier portion for carrying an address length identifier for indicating a bit length of each of said addresses of said transmission source or said transmission destination.

3. A data transmission system as claimed in claim 2, wherein said single frame format further comprises a control field for carrying a control data unit, said frame identifier field, said control field, said address field, and said data field being time-sequentially arranged in this order, said frame identifier field further comprising a control length identifier portion for carrying a control length identifier for indicating a bit length of said control data unit.

4. A data transmission system as claimed in claim 1, wherein said single frame format further comprises a control field for carrying a control data unit, said frame identifier field, said control field, said address field, and said data field being time-sequentially arranged in this order, said frame identifier field further comprising a control length identifier portion for carrying a control length identifier for indicating a bit length of said control field.

5. In a data transmission system for transmitting a packet signal determined by a single frame format and having a transmission data unit for use in transmission of, as the transmission data unit, one of a plurality of different-type data units from a transmission source to a transmission destination in an integrated network system of a plurality of different-type network systems, said different-type data units being associated with said different-type network systems, respectively, the improvement wherein said single frame format comprises:
   a data field for carrying the transmission data unit;
   an address field comprising a source address portion and a destination address portion for carrying addresses assigned to the transmission source and the transmission destination in the integrated network system, respectively, each of said source and destination address portions having a bit length which is variable from zero bit length to a predetermined maximum bit length; and a frame identifier field comprising a type identifier portion for carrying a type identifier for indicating a specific one of the different-type network systems which said transmission data unit is associated with, and an address length identifier portion for carrying an address length identifier for indicating a bit length of said each address portion.

6. A data transmission system as claimed in claim 5, wherein said single frame format further comprises a control field for carrying a control data unit, said control field having a bit length which is variable from a zero bit length to a predetermined maximum bit length, said frame identifier field, said control field, said address field, and said data field being time-sequentially arranged in this order, said frame identifier field further comprising a control length identifier portion for carrying a control length identifier for indicating a bit length of said control data unit.

7. In a packet signal transmission system for transmitting the packet signal determined by a frame format and having a transmission information unit for use in transmission of, as the transmission information unit, one of a plurality of different-type information units from a transmission source to a transmission destination in an integrated network system of a plurality of different-type network systems, said different-type information units being associated with said different-type network systems, respectively, each of said different-type information units comprising a control information set and a transmission data unit, said control information set having a bit length inherent to an associated one of said different-type network systems, the improvement wherein said single frame format comprises:

a data field for carrying the transmission data unit of a specific one of said different-type transmission information units as a specific transmission data unit;

a control field for carrying the control information set in said specific transmission information unit as a specific control information set, said control field having a bit length which is variable from a zero length to a predetermined maximum length;

an address field comprising a source address field portion and a destination address field portion for carrying addresses assigned to the transmission source and the transmission destination in the integrated network system, respectively; and a frame identifier field comprising a control length identifier portion for carrying a control length identifier for indicating the bit length of said specific control information set.

8. An integrated network system comprising a first type network, a second type network, and a plurality of terminal devices each for accessing one of said first type or second type networks by delivering a packet signal, said first type network having an address assigned thereto as a first address, said terminal devices having addresses assigned thereto as terminal addresses, wherein each of said terminal devices comprises:

a first and a second data sources for generating a first type and a second type data unit to be transmitted to the first type and the second type networks, respectively;

data selecting means responsive to a data selecting signal for selecting one of said first and second data units as a transmission data unit;

address attaching means coupled to said data selecting means for attaching an address information set to said transmission data unit to produce an address attached data signal, said address information set comprising a pair of source and destination addresses, said source address being one of said terminal addresses assigned to the terminal device itself said destination address being the first address when said transmission data unit is said first type data unit and being another of said terminal addresses when said transmission data unit is the second type data unit;

frame identifier attaching means coupled to said address attaching means for attaching a frame identifier to said address attached data signal to produce said packet signal, said frame identifier comprising a type identifier for indicating the type of said transmission data unit; and transmission control means for delivering said data selecting signal, said address information set, and said frame identifier to said data selecting means, said address attaching means, and said frame identifier attaching means, respectively.

9. An integrated network system as claimed in claim 8, wherein said frame identifier further comprises an address length identifier for indicating a bit length of said source and destination address.

10. An integrated network system as claimed in claim 9, further comprising a switching means responsive to said packet signal for detecting said type identifier in said packet signal, said switching means supplying said packet signal to said first type network when said type identifier is the first type, and said switching means supplying said packet signal to said second type network when said type identifier is the second type, wherein said address length identifier indicates zero when said transmission data unit is said first type data unit.

11. An integrated network system as claimed in claim 8, a specific one of said first type or said second type network systems delivering a specific packet signal for accessing one of said terminal devices, each of said terminal devices receiving said specific packet signal as a reception packet signal, said reception packet signal comprising a reception data unit, a reception address information set of a reception source address and a reception destination address, and a reception frame identifier having a reception type identifier, wherein each of said terminal devices further comprises:

first data processing means for processing a first type reception data unit;

second data processing means for processing a second type reception data unit;

destination detecting means for detecting said reception destination address in said reception packet signal to deliver said reception packet signal when said reception destination signal coincides with the terminal address assigned to the terminal device itself;

frame identifier discriminating means coupled to said destination detecting means for discriminating said reception frame identifier in said reception packet signal to produce a discriminated signal and to deliver said reception packet signal;

source detecting means coupled with said frame identifier discriminating means for detecting said reception source address in said reception packet signal to produce a detected signal and to deliver said reception packet signal;

reception control means coupled to said frame identifier discriminating means and said source detecting means for producing a selection control signal based on said discriminated signal and said detected signal, said selection control signal being a first selection signal when at least one of said discriminated signal and said detected signal indicates a first type, and said selection control signal being a second selection signal when none of said discriminated signal and said detected signal is said first type; and processor selecting means responsive to said selection control signal for selecting on of said first or said second data processing means as a selected data processing means to deliver said reception data unit in said reception packet signal to said selected data processing means, whereby said first data processing means receives said reception data unit as said first type reception data unit when said selection control signal is said first type selection signal, said second data processing means receiving said reception data unit as said second type reception data unit when said selection control signal is said second type selection signal.

12. An integrated network system as claimed in claim 8, a specific one of said first type or said second type network system delivering a specific packet signal for accessing one of said terminal devices, each of said terminal devices receiving said specific packet signal as a reception packet signal, said reception packet signal comprising a reception data unit, and a reception frame identifier having a reception type identifier and a reception address length identifier, said reception packet signal further comprising a reception address information set of a reception source address and a reception destination address when said reception address length identifier indicates non-zero bit length, wherein each of said terminal devices further comprises:

first data processing means for processing a first type reception data unit;

second data processing means for processing a second type reception data unit;

frame identifier discriminating means for discriminating said reception frame identifier in said reception packet signal to produce a discriminated signal and to deliver said reception packet signal, said frame identifier discriminating means producing an unable signal when said address length identifier indicates zero-bit length;

destination detecting means coupled to said frame identifier discriminating means for detecting said reception destination address in said reception packet signal to deliver said reception packet signal when said reception destination signal coincides with the terminal address assigned to the terminal device, said destination detecting means being unable in response to said unable signal and allowing said reception packet signal to pass therethrough;

source detecting means coupled with said frame identifier discriminating means and said destination detecting means for detecting said reception source address in said reception packet signal to produce a detected signal and to deliver said reception packet signal, said source detecting means being unable in response to said unable signal and allowing said reception packet signal to pass therethrough;

reception control means coupled to said frame identifier discriminating means and said source detecting means for producing a selection control signal based on said discriminated signal and said detected signal, said selection control signal being a first selection signal when at least one of said discriminated signal and said detected signal indicates a first type, sand said selection control signal being a second selection signal when none of said discriminated signal and said detected signal is said first type; and processor selecting means responsive to said selection control signal for selecting one of said first or said second data processing means as a selected data processing means to deliver said reception data unit in said reception packet signal to said selected data processing means, whereby said first data processing means receives said reception data unit as said first type reception data unit when said selection control signal is said first type selection signal, said second data processing means receiving said reception data unit as said second type reception data unit when said selection control signal is said second type selection signal.

* * * * *

UNITED STATES PATENT AND TRADEMARK OFFICE
CERTIFICATE OF CORRECTION

PATENT NO. : 4,926,420

DATED : May 15, 1990

INVENTOR(S) : Hiroshi SHIMIZU

It is certified that error appears in the above-identified patent and that said Letters Patent is hereby corrected as shown below:

Col. 11, line 22, delete "resepectively" and insert --respectively--.

Col. 16, line 29, delete "sand" and insert --and--.

Signed and Sealed this

Seventeenth Day of December, 1991

Attest:

HARRY F. MANBECK, JR.

*Attesting Officer*    *Commissioner of Patents and Trademarks*